United States Patent [19]

Bignell

[11] Patent Number: 5,493,916
[45] Date of Patent: Feb. 27, 1996

[54] MODE SUPPRESSION IN FLUID FLOW MEASUREMENT

[75] Inventor: Noel Bignell, Annandale, Australia

[73] Assignee: Commonwealth Scientified and Industrial Research Organisation—AGL Consultancy Pty Ltd., Australia

[21] Appl. No.: 175,362

[22] PCT Filed: Jun. 25, 1992

[86] PCT No.: PCT/AU92/00315

§ 371 Date: Feb. 2, 1994

§ 102(e) Date: Feb. 2, 1994

[87] PCT Pub. No.: WO/9300570

PCT Pub. Date: Jan. 7, 1993

[30] Foreign Application Priority Data

Jun. 25, 1991 [AU] Australia .................................. PK6894

[51] Int. Cl.$^6$ ........................................................ G01F 1/66
[52] U.S. Cl. ........................................ 73/861.28; 73/861.27
[58] Field of Search ........................... 73/861.25, 861.26, 73/861.27, 861.28, 861.29, 861.31, 170.13

[56] References Cited

U.S. PATENT DOCUMENTS

| | | | |
|---|---|---|---|
| 2,831,348 | 4/1958 | Kritz | 73/194 |
| 3,282,101 | 11/1966 | Yamamoto | 73/194 |
| 3,329,017 | 7/1967 | Yamamoto et al. | 73/194 |
| 3,512,410 | 5/1970 | Vander Heyden | 73/194 |
| 3,767,938 | 10/1973 | Kueper | 307/291 |
| 3,792,204 | 2/1974 | Murayama et al. | 179/110 A |
| 3,816,774 | 6/1974 | Ohnuki et al. | 310/8.6 |
| 3,824,464 | 7/1974 | Rotier et al. | 324/186 |
| 3,832,580 | 8/1974 | Yamamuro et al. | 310/9.5 |
| 3,869,915 | 3/1975 | Baumoel | 73/194 A |
| 3,898,878 | 8/1975 | Stallworth et al. | 73/181 |
| 3,918,304 | 11/1975 | Abruzzo et al. | 73/194 A |
| 3,947,644 | 3/1976 | Uchikawa | 179/110 A |
| 3,954,008 | 5/1976 | Yamamoto et al. | 73/194 A |
| 3,973,150 | 8/1976 | Tamura et al. | 310/9.5 |
| 3,974,693 | 8/1976 | Hardies | 73/194 A |
| 3,977,247 | 8/1976 | Hassler et al. | 73/194 A |
| 4,003,256 | 1/1977 | Donelan et al. | 73/194 A |

(List continued on next page.)

FOREIGN PATENT DOCUMENTS

| | | |
|---|---|---|
| 3624589 | 1/1990 | Australia . |
| 6475590 | 5/1991 | Australia . |
| 61-104276 | 5/1986 | Japan . |
| 0152132 | 1/1985 | Netherlands . |
| WO8602722 | 5/1986 | Netherlands . |
| 1595973 | 8/1981 | United Kingdom . |

OTHER PUBLICATIONS

H. Lechner, *Ultrasonic Flow Metering Based on Transit Time Differentials Which are Insensitive to Flow Profile*, vol. 74, No. 3 Journal of the Acoustical Society of America, Sep. 1983, pp. 955–959.

Makahito Tamura et al., "Electroacoustic Transducers With Piezoelectric High Polymer Films," Presented Sep. 10, 1974 at the 49th Convention of the Audio Engineering Society, New York, Jan./Feb. 1975, vol. 23, No. 1.

Yoshida et al. English Translation of Laid–open Patent Application No. 61–104276 filed May 22, 1986.

*Primary Examiner*—Richard Chilcot
*Assistant Examiner*—Elizabeth L. Dougherty
*Attorney, Agent, or Firm*—Dressler, Goldsmith Shore & Milnamow, Ltd.

[57] ABSTRACT

Disclosed is a method and apparatus with which errors caused by the propagation of high order accoustic modes in ultrsonic flow measurement are reduced. Accoustic wave packets are transmitted between two transducers (1,2) arranged in a duct (3). A ringaround transmission technique is used and implemented by a control device (4) in which every fourth wave packet is inverted with respect to the preceding packets in order to annul the propagation effects of high order modes in the duct (3). This permits increased accuracy in the detection of reception of the wave packets by the transducers (1,2) enabling increased accuracy in flow velocity measurment.

28 Claims, 7 Drawing Sheets

U.S. PATENT DOCUMENTS

| | | | |
|---|---|---|---|
| 4,008,408 | 2/1977 | Kodama | 310/9.1 |
| 4,011,755 | 3/1977 | Pedersen et al. | 73/194 A |
| 4,022,058 | 5/1977 | Brown | 73/194 A |
| 4,024,760 | 5/1977 | Estrada, Jr. | 73/194 A |
| 4,028,566 | 6/1977 | Franssen et al. | 310/9.5 |
| 4,056,742 | 11/1977 | Tibbetts | 310/357 |
| 4,064,375 | 12/1977 | Russell et al. | 179/110 A |
| 4,079,315 | 3/1978 | Mohr | 324/129 |
| 4,080,574 | 3/1978 | Loosemore et al. | 328/109 |
| 4,088,915 | 5/1978 | Kodama | 310/334 |
| 4,103,551 | 8/1978 | Lynnworth | 73/194 A |
| 4,156,800 | 5/1979 | Sear et al. | 179/110 A |
| 4,176,337 | 11/1979 | Aechter et al. | 367/131 |
| 4,183,244 | 1/1980 | Kohno et al. | 73/194 A |
| 4,195,517 | 4/1980 | Kalinoski et al. | 73/194 A |
| 4,232,548 | 11/1980 | Baumoel | 73/861.28 |
| 4,300,401 | 11/1981 | Pedersen | 73/861.31 |
| 4,308,754 | 1/1982 | Pedersen et al. | 73/861.28 |
| 4,311,924 | 1/1982 | Breckel et al. | 307/354 |
| 4,312,238 | 1/1982 | Rey | 73/861.28 |
| 4,334,543 | 6/1982 | Fehr | 128/663 |
| 4,336,719 | 6/1982 | Lynnworth | 73/861.27 |
| 4,352,999 | 10/1982 | Galpin | 307/354 |
| 4,384,491 | 5/1983 | Brown et al. | 73/861.28 |
| 4,425,805 | 1/1984 | Ogura et al. | 73/861.29 |
| 4,473,769 | 9/1984 | Nguyen | 310/334 |
| 4,480,485 | 11/1984 | Bradshaw et al. | 73/861.28 |
| 4,483,202 | 11/1984 | Ogura et al. | 73/861.27 |
| 4,515,021 | 5/1985 | Wallace et al. | 73/861.27 |
| 4,528,853 | 7/1985 | Lerch et al. | 73/624 |
| 4,538,469 | 9/1985 | Lynnworth et al. | 73/861.27 |
| 4,549,107 | 10/1985 | Kaneko et al. | 310/327 |
| 4,578,613 | 3/1986 | Posthuma de Boer et al. | 310/800 |
| 4,583,410 | 4/1986 | O'Neil | 73/861.28 |
| 4,603,589 | 8/1986 | Machida | 73/861.28 |
| 4,618,796 | 10/1986 | Riedlinger | 310/311 |
| 4,628,725 | 12/1986 | Gouilloud et al. | 73/19 |
| 4,646,575 | 3/1987 | O'Hair et al. | 73/861.31 |
| 4,704,774 | 11/1987 | Fuji et al. | 29/25.35 |
| 4,725,994 | 2/1988 | Kaneko et al. | 367/140 |
| 4,754,650 | 7/1988 | Smalling et al. | 73/861.28 |
| 4,787,252 | 11/1988 | Jacobson et al. | 73/861.28 |
| 4,820,952 | 4/1989 | Lee | 310/334 |
| 4,825,116 | 4/1989 | Itoh et al. | 310/335 |
| 4,849,946 | 7/1989 | Beauducel | 367/155 |
| 4,885,942 | 12/1989 | Magori | 73/861.28 |
| 4,906,886 | 3/1990 | Breimesser et al. | 310/334 |
| 4,922,750 | 5/1990 | Magori | 73/118.2 |
| 4,930,358 | 6/1990 | Motegi et al. | 73/861.28 |
| 4,933,915 | 6/1990 | Boström | 367/99 |
| 5,123,286 | 6/1992 | Baumgärtner | 73/861.27 |
| 5,163,331 | 11/1992 | Gill | 73/861.28 |
| 5,178,018 | 1/1993 | Gill | 73/861.28 |
| 5,179,862 | 1/1993 | Lynnworth | 73/861.28 |
| 5,343,744 | 9/1994 | Ammann | 73/170.13 |

| | Transmitter | | | | | | | | Receiver |
|---|---|---|---|---|---|---|---|---|---|
| 0 | ↑ A | | | | | | | | |
| τ | ↑ B | | 4↑ A | 3↑ A | | 2↑ A | | | 1↑ A |
| 2τ | ↑ C | | 4↑ B | 3↑ B | 4↑ 2↑ AB | | 3↑ A | | 1↑ 2↑ B A |
| 3τ | ↑ D | | 4↑ C | 3↑ C | 4↑ 2↑ BC | | 3↑ B | 4↑ A | 1↑ 2↑ 3↑ CBA |
| 4τ | ↑ E | | 4↑ D | 3↑ D | 4↑ 2↑ CD | | 3↑ C | 4↑ B | 1↑ 2↑ 3↑ 4↑ DCBA |
| 5τ | ↑ F | | 4↑ E | 3↑ E | 4↑ 2↑ DE | | 3↑ D | 4↑ C | 1↑ 2↑ 3↑ 4↑ EDCB |
| 6τ | ↑ G | | 4↑ F | 3↑ F | 4↑ 2↑ EF | | 3↑ E | 4↑ D | 1↑ 2↑ 3↑ 4↑ FEDC |

MODE SUPPRESSION IN FLUID FLOW MEASUREMENT

FIELD OF INVENTION

The present invention relates to ultrasonic flow meters and in particular, to a method by which errors in measurement caused by high order acoustic modes are minimised.

BACKGROUND TO THE INVENTION

It is known to measure the velocity of fluid flow in a duct by transmitting acoustic signals through the duct and measuring the time of propagation of the signals along the duct. For a known distance, the velocity can be calculated. Generally, measurements are taken in both directions along the duct to provide for increased accuracy of the result.

However, when a pulsed acoustic signal is propagated within a duct, the acoustic wave packet breaks into a number of transition modes each having a frequency corresponding to the transmitting frequency but having a difference phase whereby at different points along the duct, each mode has its own set of null points at which the amplitude of the mode wave is zero. Also, the different modes have different acoustic velocities.

In order to obtain flow measurements, the acoustic wave must be received by a transducer or like apparatus arranged at some point within the duct. The receive transducer however does not receive a single pulse of acoustic energy as was transmitted, but however, it receives the various modes each having a different energy level and being received at different times. Depending on the energy level of the received signal, it will be apparent that errors arise in determining a point in time in which a particular wave packet is received and hence a flow measurement can be determined. Because of this, the errors are carried over to the resulting flow velocity calculation.

It is an object of the present invention to substantially overcome or ameliorate, the abovementioned problems through provision of a method by which flow velocity errors can be substantially reduced.

DISCLOSURE OF THE INVENTION

In accordance with a first embodiment of the present invention there is disclosed a method for measuring time of flight of a plurality of acoustic wave packets between two locations in a fluid having at least one acoustically reflective surface in the path of said packets, said method comprising the steps of:

(a) transmitting at least one acoustic wave packet, having a first phase, between the locations and measuring time of flight thereof; and (b) transmitting an acoustic wave packet having a phase inverted with respect to the immediately preceding packet or having an inverted polarity with respect to the immediately preceding packet to substantially reduce the effects of high order acoustic modes on the immediately preceding wave packet(s) having the first phase and/or immediately following wave packet(s) having the first phase, and measuring a time of flight thereof.

Generally, the extremities of the path are defined by a duct for carrying the fluid, and preferably is a conduit.

Advantageously, steps (a) and (b) are repeated a plurality of times (eg 1 to $10^6$, typically 32 to 64) and an average time of flight may be calculated which can then be utilised for determining parameters related to the fluid medium such as fluid flow rate, for example.

Generally, the high order modes of the inverted wave packet act to annul the high order modes of succeeding wave packets.

Typically, the acoustic wave packets are transmitted between two or more transducers which are typically ultrasonic transducers, and the transmission of successive wave packets is initiated immediately on reception of an acoustic wave packet by one of the transducers.

In accordance with a second embodiment of the present invention there is disclosed a method for determining fluid flow velocity in a duct in which first and second acoustic transducers are spaced by a predetermined distance within said duct, the method comprising the steps of:

(1) transmitting an acoustic wave packet (having a first phase) from said first transducer to said second transducer;

(2) detecting said acoustic wave packet at said second transducer and recording a time of travel of said acoustic wave packet between said transducers;

(3) performing steps (1) and (2) i times (i=1, 2, 3, . . .) whereby successive transmissions are initiated upon the detection of the immediately preceding acoustic wave packet;

(4) performing steps (1) and (2) by transmitting an acoustic wave packet having a (second) phase or polarity inverted with respect to said first phase;

(5) performing steps (1) to (4) j times (j=1, 2, 3, . . .);

(6) performing steps (1) to (5) except however by transmitting from said second transducer and detecting at said first transducer; and (7) summing the times of travel in each direction, and, for the number (n) of transmissions in each direction (n=ij), determining an average time of travel in each direction to enable the calculation therefrom of the fluid flow velocity using said predetermined distance.

In accordance with a third embodiment of the present invention there is disclosed apparatus for determining the flow velocity of a fluid, said apparatus comprising:

two acoustic transducers separated by a predetermined distance within said fluid and arranged to transmit and receive acoustic energy between each other, there being at least one acoustically reflective surface between said transducers;

controls means outputting a first signal to initiate transmission of an acoustic wave packet between said transducers;

transmitter means enabled by said first signal and connected to one of said transducers for energizing said one transducer to emit an acoustic wave packet;

receiver means connected to the other said transducer for receiving said acoustic wave packet and to provide a second signal corresponding to the reception of said wave packet;

timer means connected to said first signal for starting a clock that times the propagation of said wave packet along said duct between said transducers and connected to said second signal for stopping said clock;

wherein said second signal further inputs to said control means to immediately cause the emission of a further said first signal so as to cause a sequential emission of a series of said wave packets, said control means also outputting to said transmitter means an inversion signal concurrent with one of a predetermined number of said first signals, said inversion signal causing said transmitter means and said one transducer to output an acoustic wave packet inverted with respect to the immediately preceding wave packet, the times recorded by said timer means being stored and subsequently averaged for the calculation of a fluid flow velocity using said predetermined distance by said control means.

Most preferably, an inverted acoustic wave packet is transmitted after the transmission of three wave packets having like phase. The fluid can be a gas or a liquid, or both.

BRIEF DESCRIPTION OF THE DRAWINGS

A preferred embodiment of the present invention will now be described with reference to the drawings in which:

FIG. 3 is a tabulature representation of a prior art transmission arrangement showing various modal types and which results in significant errors;

FIG. 4 is a tabulature representation of a transmission arrangement of the preferred embodiment showing various modal types which result in substantially reduced errors;

BEST OF OTHER MODES OF THE PERFORMING THE INVENTION

Figure 1:
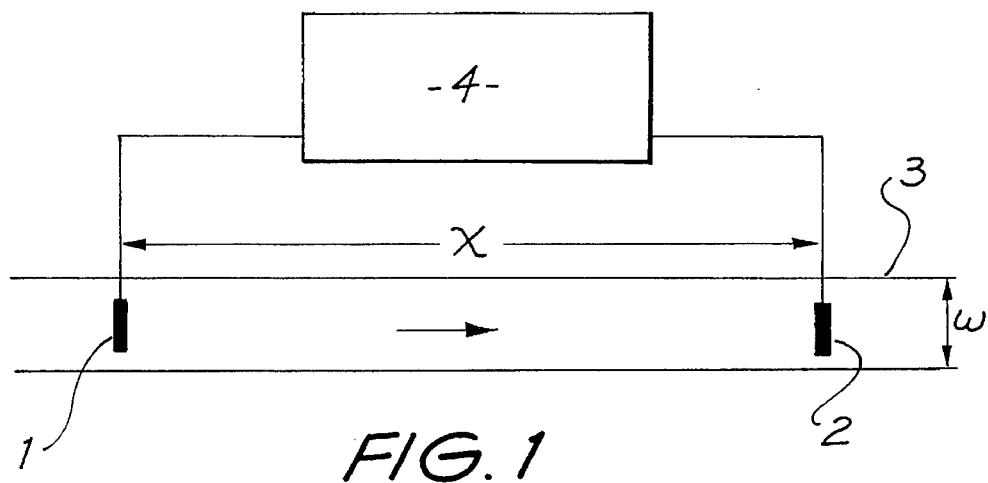
FIG. 1 shows a simplified arrangement for measuring fluid velocity.

FIG. 1 shows a simple arrangement for the measurement of fluid velocity. Two acoustic transducers 1 and 2 face each other within a fluid carrying duct 3 and are separated by a known distance $\chi$. An electronics module 4 connects to the transducers 1,2 and provides signal drive for transmission, signal detection and reception, memory storage and velocity calculation. The arrow indicates the direction of fluid flow, in this case from transducer 1 to transducer 2.

It is possible to measure the velocity of the fluid flowing in the duct 3 by the measurement of the two transit times of an acoustic signal propagating in turn in the direction of flow (1 to 2) and in the direction opposed to the flow (2 to 1). The velocities of travel of these signals are affected by the velocity of the medium manner of addition i.e.

$$v_s = c \pm v_f \quad (1)$$

where $v_s$ the velocity of the signal, c is the acoustic velocity in the medium when it is stationary and $v_f$ is the velocity of the medium. When the signal is propagating in the direction of the flow the positive sign is used and when it is propagating in the opposing direction the negative sign is used. Thus $$v_{s+} = c + v_f \quad (2)$$

$$v_{s-} = c - v_f \quad (3)$$

It is then possible to write the times of travel $\tau_+$ and $\tau_-$ of the signal as $$\tau_+ = \frac{\chi}{v_{s+}} = \frac{\chi}{c + v_f} \quad (4)$$

$$\tau_- = \frac{\chi}{v_{s-}} = \frac{\chi}{c - v_f} \quad (5)$$

where $\chi$ is the distance the signal travels. Then, $$v_f = \frac{\chi}{2} \left( \frac{1}{\tau_+} - \frac{1}{\tau_-} \right). \quad (6)$$

In the measurement of these transit times it is convenient to employ a technique known as the ring-around or sing-around method. In this technique when a pulse is detected another is immediately launched. This has the operational advantage that the measurement of the time of travel of a signal is made easier because a larger time interval corresponding to a large number of traversals of a pulse can be measured instead of the time for just one traversal. The number of traversals must of course also be measured but this is easily done. The value of $$\tau = t/n \quad (7)$$

$\tau$ can then be taken as where t is the time interval for n traversals.

When acoustic waves propagate in a duct they may do so in a number of modes. These modes may be thought of as corresponding to solutions for the appropriate wave equations in a duct and it is from the mathematical characterisation of these solutions that the modes may be distinguished, e.g. 0,0 or 1,3. Alternatively, the modes may be thought of as propagating through the duct by reflections from the walls. A mode which passes straight through without reflection from the walls is behaving much the same as an unconfined wave and is called either the basic, primary or plane wave mode. Other modes are reflected one or more times. The pair of numbers given to each mode may, in the case of a rectangular cross-section duct, be thought of as the number of reflections from each of the parallel walls but similar though conceptually more abstract considerations apply to ducts of other cross-section. About 50% of the acoustic energy resides in the basic mode, with the remainder in the higher modes. Most of the energy in the higher modes resides in the 0,2 mode. Unless steps are taken to attenuate the higher transmission modes, unwanted acoustic energy builds up in the measurement tube, causing distortion of the waveform and making impossible the correct determination of travel time.

Experimentation has shown that it is the ratio of the length ($\chi$) and the diameter ($\omega$) of the duct 3 in FIG. 1 that is significant to the amount of energy imparted into the high order modes. For a small diameter $\omega$ the dispersion of the transmitted wave causes much energy to be reflected from the walls of the duct 3 at relatively wide angles. This results in multi-path propagation along the duct 3. Where the ratio $\chi/\omega$ is small, high order modes do not tend to propagate due to relatively small angle reflections in the vicinity of the transmitting transducer. However, conflicting with this otherwise desirable phenomena is the fact that it is practically very difficult to obtain accurate flow measurements at low flow velocities when $\chi/\omega$ is small. Such is the case for measuring pilot flow in gas reticulation systems.

Figure 2A:
FIG. 2A shows the propagation of a primary or basic mode with a duct.
Figure 2B:
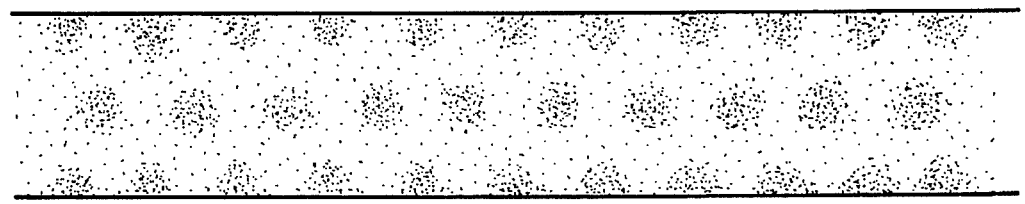
FIG. 2B shows the propagation of the first high order mode (the "02" mode) within the duct.

FIG. 2A shows a representation of the basic mode and FIG. 2B that the 0,2 mode. Higher order modes are not shown as they are complex. However, these modes do not propagate with the same velocity, but it can be shown that the plane wave mode travels faster than the others which causes a difficulty in the application of the ring-around technique. A mode which travels at half the velocity of the plane wave mode will arrive at the same time as the plane wave mode that was launched one sing-around period after it was generated. One travelling at one third the velocity will arrive coincident with the plane wave mode launched two periods after it began, and so on for other modes. The modes travelling at velocities which are not integral sub-multiples of the plane wave mode velocity will arrive at times other than when the plane wave is arriving at the receiver.

The arrival of the integral submultiple modes up to the mode of one quarter the velocity of the plane wave mode is shown in FIG. 3 for various successive periods of the ring-around, which are denoted by A, B, C, etc. The position of the signal between the transmitter and receiver is shown by an arrow and the number at the head of the arrow indicates its integral relationship with the plane wave mode velocity so that 3 represents a wave of one third plane wave velocity. The letter at the base of the arrow gives the ring-around period in which it was generated.

The principle of superposition says that the effect of these modes at the receiver transducer is the sum of their individual effects. This means that when the electronics module 4 is operating for the detection of the time of arrival of the plane wave, that when the plane wave and one or more other modes arrive together there will be an effect on the operation of the electronics module 4 in that it will indicate a time of arrival different from that of the plane wave. This in itself may not necessarily cause a serious detriment in performance but when the fluid medium is moving at varying velocities then the modes will be affected by this motion in different proportions so that their combined effect by superposition at the receiver will be different and a different time of travel will be indicated by the detector. This difference of time of travel from the plane wave mode time will thus be some function of velocity. Since the time of travel of the plane wave mode (or another particular mode) depends on $v_p$ as shown by equations (4) and (5), any two modes of different values of c which have certain phase relationship at the receiver transducer at one flow rate will have a different one at another flow rate.

These complex dependencies will be evidenced as errors in the value of $v_f$ as measured by the method of time interval measurement using equation (6). It is therefor necessary for accurate measurements or very considerably reduce this error.

Signals with which the transducers 1,2 are excited are generally oscillatory with no zero offset, unless introduced by the electronics. Also, they are not of constant amplitude since to obtain a particular time reference point from them requires some sort of pulse behaviour.

The received signal may be expressed as a function of time, F(t) and for timing purposes a particular characteristic of the signal must be taken to give the instant of reception. Frequently this is a zero crossing i.e. one of the solutions $\tau$ to the equation $$F(t)=0 \qquad (8)$$

so that $$F(\tau)=0. \qquad (9)$$

When a perturbing signal is present in the form of a slower velocity mode the, representing the mode by f(t), by the principle of superposition the received signal will be F(t)+f(t) and the zero crossing will be the solution to the equation $$F(t)+f(t)=0 \qquad (10)$$

which, in general, will not be equal to $\tau$.

However, the transmitted signal in positive or inverted form, and as such, the received signal will be F(t) or −F(t). Also the perturbing signal generated at the same time, but not received at the same time, will be f(t) or −f(t). Thus four possible signals could be received, viz $$\begin{aligned}
&\text{(i)} \quad +F(t)+f(t) \quad ] \\
&\text{(ii)} \quad -F(t)-f(t) \quad ] \\
&\text{(iii)} \quad +F(t)-f(t) \quad ] \\
&\text{(iv)} \quad -F(t)+f(t) \quad ]
\end{aligned} \qquad (11)$$

The particular zero crossing for the unperturbed signal will be shifted in time due to the presence of the perturbing-signal f(t). The time of the zero crossing will be the appropriate solution of the four equations formed by equating to zero each of the above expressions (i) to (iv). Equations (i) and (ii) have the same solution as do (iii) and (iv). By calling these solutions $\tau_1$ and $\tau_2$ they may be expressed $$\tau_1=\tau+\delta\tau_1 \qquad (12)$$

$$\tau_2=\tau+\delta\tau_2 \qquad (13)$$

where $\delta\tau_1$ and $\delta\tau_2$ are the small changes in $\tau$ caused by the small perturbation f(t). Then (i) and (ii) give $$F(\tau+\delta\tau_1)+f(\tau+\delta\tau_1)=0. \qquad (14)$$

An approximate Taylor expansion of this gives $$F(\tau)+F'(\tau)\delta\tau_1+f(\tau)+f'(\tau)\delta\tau_1=0 \qquad (15)$$

$$\delta\tau_1 = \frac{-f(\tau)}{F'(\tau)+f'(\tau)} \qquad (16)$$

Similarly $$\delta\tau_2 = \frac{f(\tau)}{F'(\tau)-f'(\tau)} \qquad (17)$$

When f(t) is near a maximum value it will generally be true that f'(t) is small. Remembering that $F(\tau)=0$, which implies that $F'(\tau)$ is near a maximum value, then $$F'(\tau) \gg f'(\tau) \qquad (18)$$

so that to a good approximation, $$\delta\tau_1 \approx \frac{-f(\tau)}{F'(t)} \qquad (19)$$

and $$\delta\tau_2 \approx \frac{f(\tau)}{F'(\tau)} = -\delta\tau_1 \qquad (20)$$

If there are two perturbing signals $f_A$ and $f_B$ then the change in timing $\delta\tau_{AB}$ is, by the above, given by $$\delta\tau_{AB} = \frac{f_A(\tau)+f_B(\tau)}{F'(\tau)} \qquad (21)$$

This is the sum of the two changes separately produced by $f_A$ and $f_B$. This means that when there are several perturbing signals acting together it is possible to consider their effects separately and add these to obtain the total effect, i.e.

$$\delta\tau_{AB}=\delta\tau_A+\delta\tau_B. \qquad (22)$$

The results of equations (20) and (22) form the basis of the method of cancellation of perturbing signals cogenerated with the desired signal. Accordingly, by inverting a ringaround pulse, it is possible to substantially reduce the error caused by the reception of high order modes.

Figure 4:
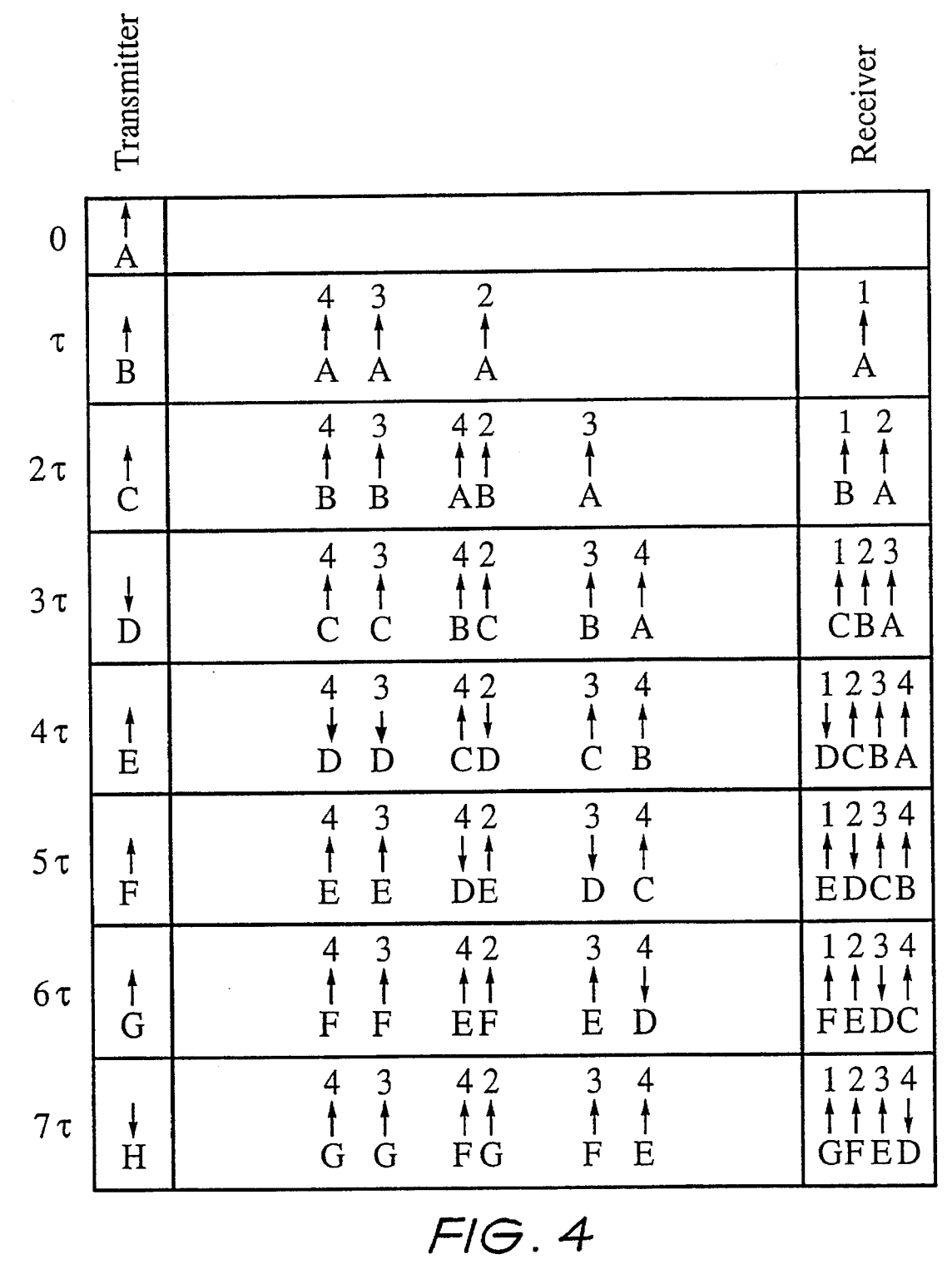

FIG. 4 Shows a table similar to FIG. 3 of the distribution of modes when one transmission in four is inverted (shown by an inverted arrow). As seen, transmissions D and H at times $3\tau$ and $7\tau$ (respectively) are inverted, and their corresponding modes propagate between the transmitter and receiver in an inverted fashion (compared to the other transmissions).

However, consider the receptions at $4\tau$, $5\tau$, $6\tau$ and $7\tau$. The interaction of the main signal with the half-speed mode is given by three of the possible four types of interaction (called (i) to (iv) previously). The first is type (iv), the second type (iii), the third type (i) and the fourth also type (i). As stated before (iii) and (iv) have the same timing error which is equal but opposite to that for (i). Hence taken together the timing errors due to the half-speed mode cancel.

The interaction of the one third-speed mode with the main signal is of types (iv), (i), (iii) and (i). These also cancel. The quarter-speed mode yields types (iv), (i), (i) and (ii) which again cancel.

The effect is best seen at the signals received at time $5\tau$. Here, the basic mode of transmission E is desired to be received, with the non-fundamental modes of transmissions D, C, B, and A (not illustrated) not desired. However, at 5, the inverted half-speed mode of transmission D acts to cancel, or nullify, the timing error of the non-inverted ⅓ and ¼ modes of transmission C and B respectively.

The sequence +1, +1, +1, −1 of transmissions (where +1 represents normal and −1 inverted) is repeated during the ringaround technique and an analysis of higher order modes reveals that the timing perturbations of all are cancelled except the ⅕, ⅑, ... $1/(4n+1)$ speed modes. The amplitudes of modes above the one quarter speed are not very large and so this represents does not a great deficiency to the results obtained.

Other combinations of normal and inverted transmissions may produce cancellations in a manner similar to that indicated by the +1, +1, +1, −1 transmission. However, for complete cancellation a sequence of an even number of transmissions is needed. Thus there is no sequence of five transmissions which produces cancellation of all modal perturbations to the fifth. It can also be shown that no sequence of six pulses exists which produces cancellation to the sixth, or to the fifth. A sequence of seven being an odd number cannot produce complete cancellation. A sequence of eight transmissions obtained by repeating the sequence +1, +1, +1, −1 will cancel modal perturbations of ½, ⅓, ¼, ⅙, ⅐ and ⅛ speed, that is, all except the ⅕ speed. There are sequences which cancel the errors due to the ⅕ speed mode but these all fail to cancel a lower order mode. These could be useful depending on the magnitudes of the various modes.

As indicated above, the propagation of the various high-order modes is dependent upon a number of factors and accordingly, the number of pulse inversions can vary from one application to another (e.g. 1 in 4 as above, or perhaps 1 in 3, or 1 in 5 for other applications). The optimum rate of pulse inversion is often best determined experimentally, but can also be derived using a mathematical analysis such as that shown above.

Figure 5A:
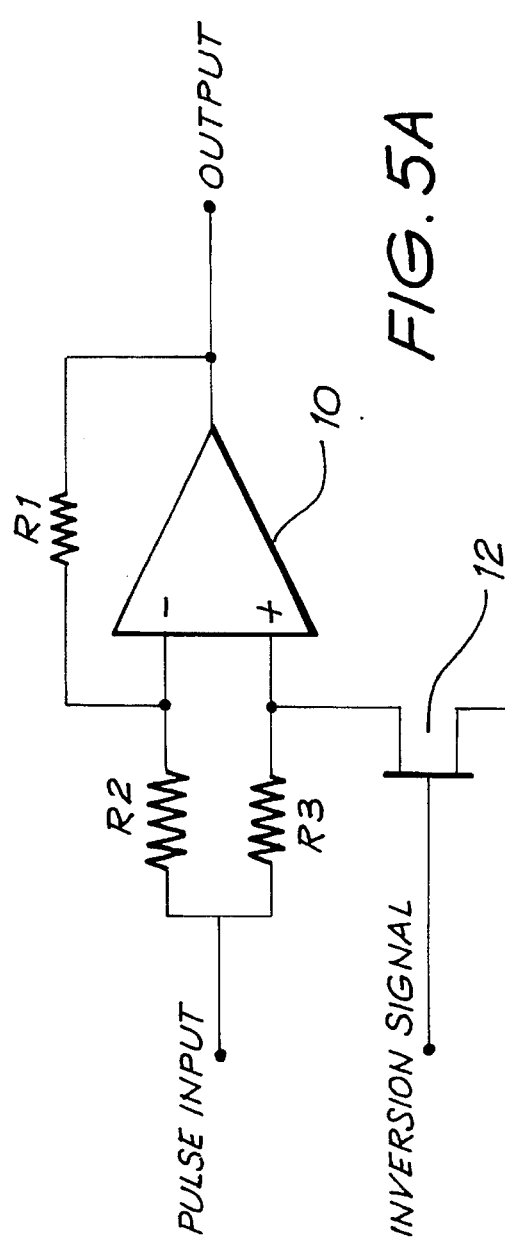
FIG. 5A shows a simple phase inversion circuit.

The inverted transmissions may be generated by any suitable technique. A scheme which is suitable for certain situations is given in FIG. 5A. Here the inversion is obtained by causing an operational amplifier 10 to have a gain of 1 or −1 as required. Resistors R1, R2 and R3 each have the same value and the Inversion Signal causes a field effect transistor 12 to vary its resistance from high to low. There are many other ways in which this may be done.

The generation of a pulse sequence to switch this circuit from normal to inverted will in detail depend on the exact sequence chosen. For the sequence of +1, +1, +1, −1 a simple divider circuit is all that is needed.

Figure 5B:
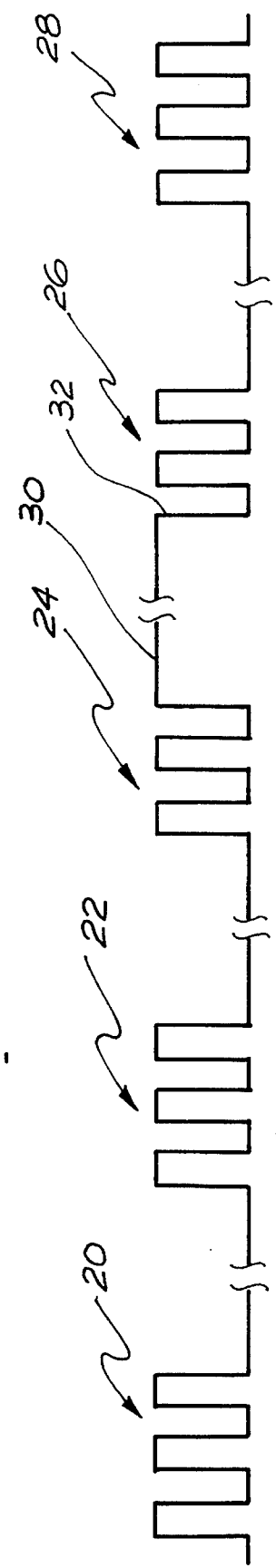
FIG. 5B shows a pulse train of the preferred embodiment for driving a tranducer.

The preferred embodiment excites the transmitting transducer (1 or 2) with a series of pulses, one such series being shown in FIG. 5B. FIG. 5B shows four sets of ringaround pulse bursts 20, 22, 24 and 26 in one series with the commencement of the next series, denoted by ringaround pulse burst 28. Each pulse burst (20,22,24,26,2B) has pulses to form a single acoustic wave packet comprising a plane wave mode and higher order modes. The bursts 20 and 22 each include three distinct pulses which provide a single acoustic wave packet having a basic mode and higher order modes.

The preferred embodiment is specifically adapted to use where only a unipolar power supply is available, such as in battery powered applications. In order to obtain an inverted wave packet, the signal is left high, as indicated at 30, whereby burst 24 includes only two and a half pulses. The third burst 26 is thereby initiated by a negative going transition 32, as opposed by the positive transition of the other bursts. Hence the wave packet associated with that burst is inverted, or has its phase shifted by 180°. Also, like its preceding packet, it is formed by a burst of two and a half pulses.

It may be necessary to invert the received signal when the main signal arrives inverted to preserve the quality of the timing pulse derived from it. A circuit similar to that of FIG. 5A can also be used for this purpose.

Figure 6:
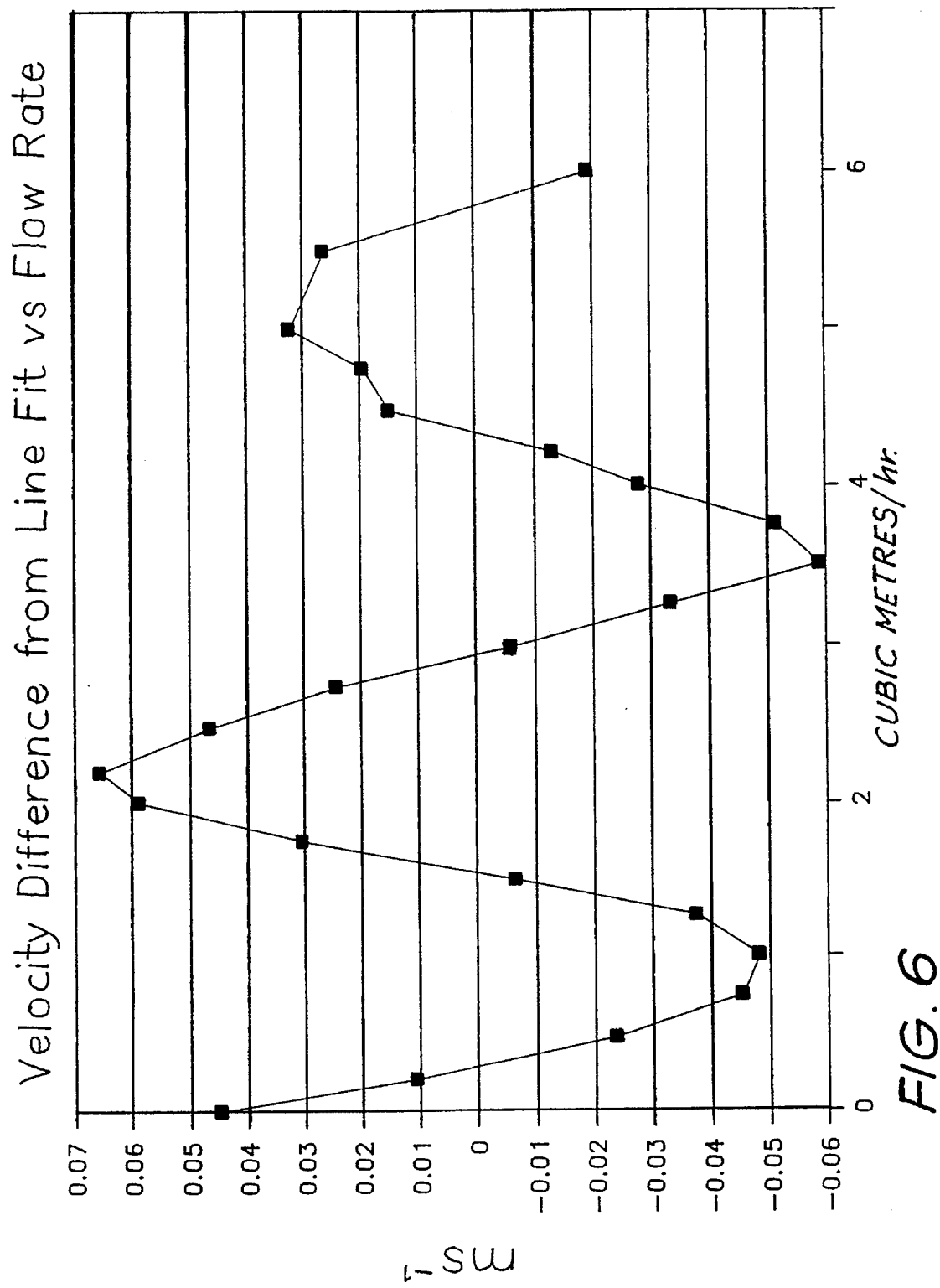
FIG. 6 is a plot of the error associated with the prior art method.
Figure 7:
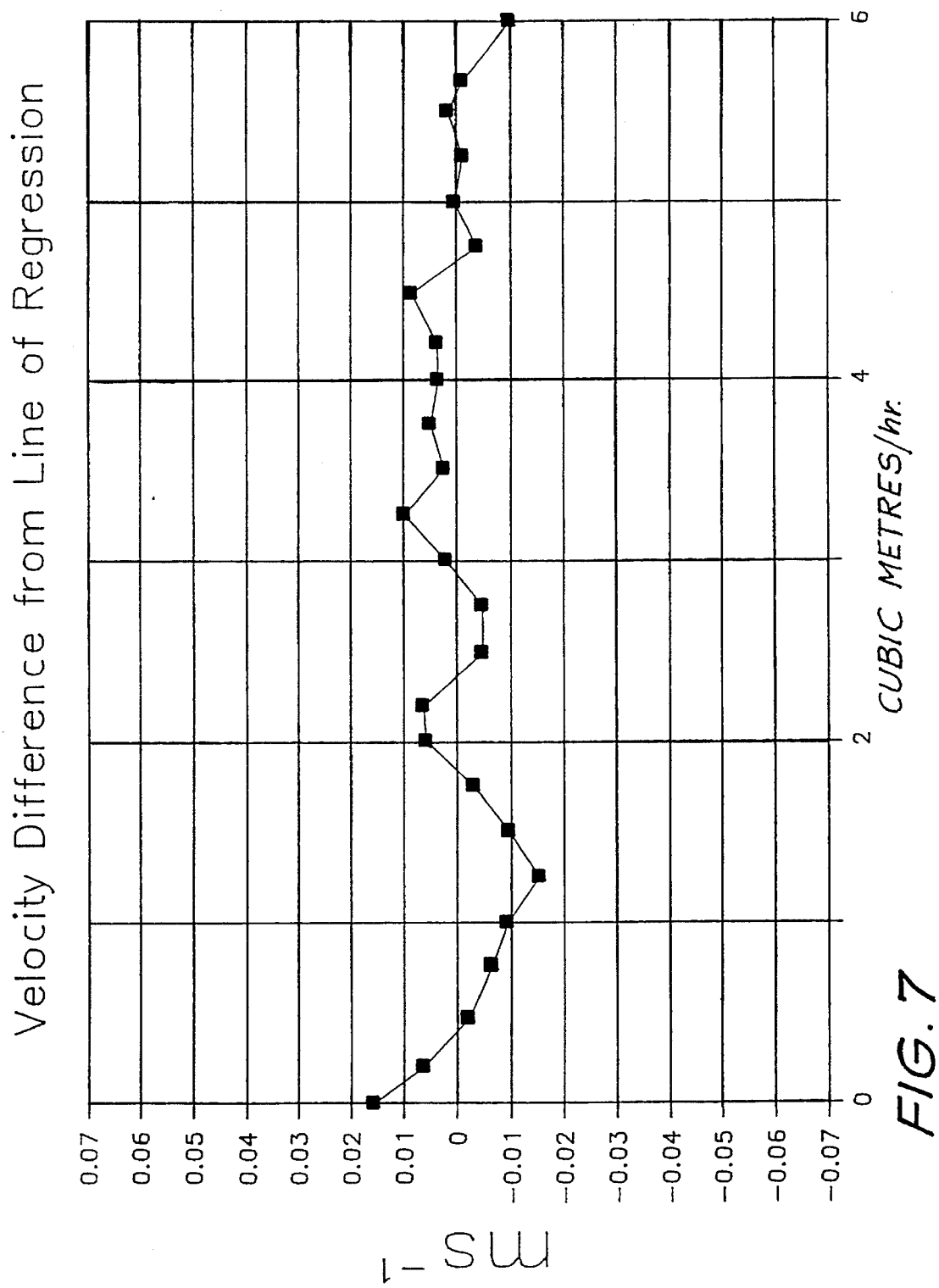
FIG. 7 is a plot of the error associated with the method of the preferred embodiment.

A gas velocity meter using the transit times upstream and downstream for measurement of the velocity has been constructed and is the subject of Australian Patent Application No. PK6891 filed concurrently herewith by the same applicants, and uses the ringaround technique to obtain suitably longer time intervals for convenient measurement. The results of a calibration of this device are shown in FIG. 6 where the deviations of the measured velocity from the straight line of best fit are shown. These clearly show acyclic variation. When the correction techniques of the preferred embodiment were applied to the preferred embodiment of the meter of Australian Patent Application No. PK 6891, the result shown in FIG. 7 was obtained which shows a very considerable improvement in the deviations from the line of best fit. The results of FIG. 7 were obtained by inverting every 4th transmit signal with detection being made on the zero crossing on the falling edge of the 3rd peak, 175 mm transducer separation, 14 mm bore, three pulses per burst at 115 KHz using natural gas at room temperature.

Accordingly, the technique of transmission of inverted signals and non-inverted signals in specific sequences can improve the timing accuracy of acoustic signals in ducts. This is particularly useful in the measurement of transit times by the ring-around technique. The transit times upstream and downstream may be used for the measurement of the fluid velocity.

Figure 8:
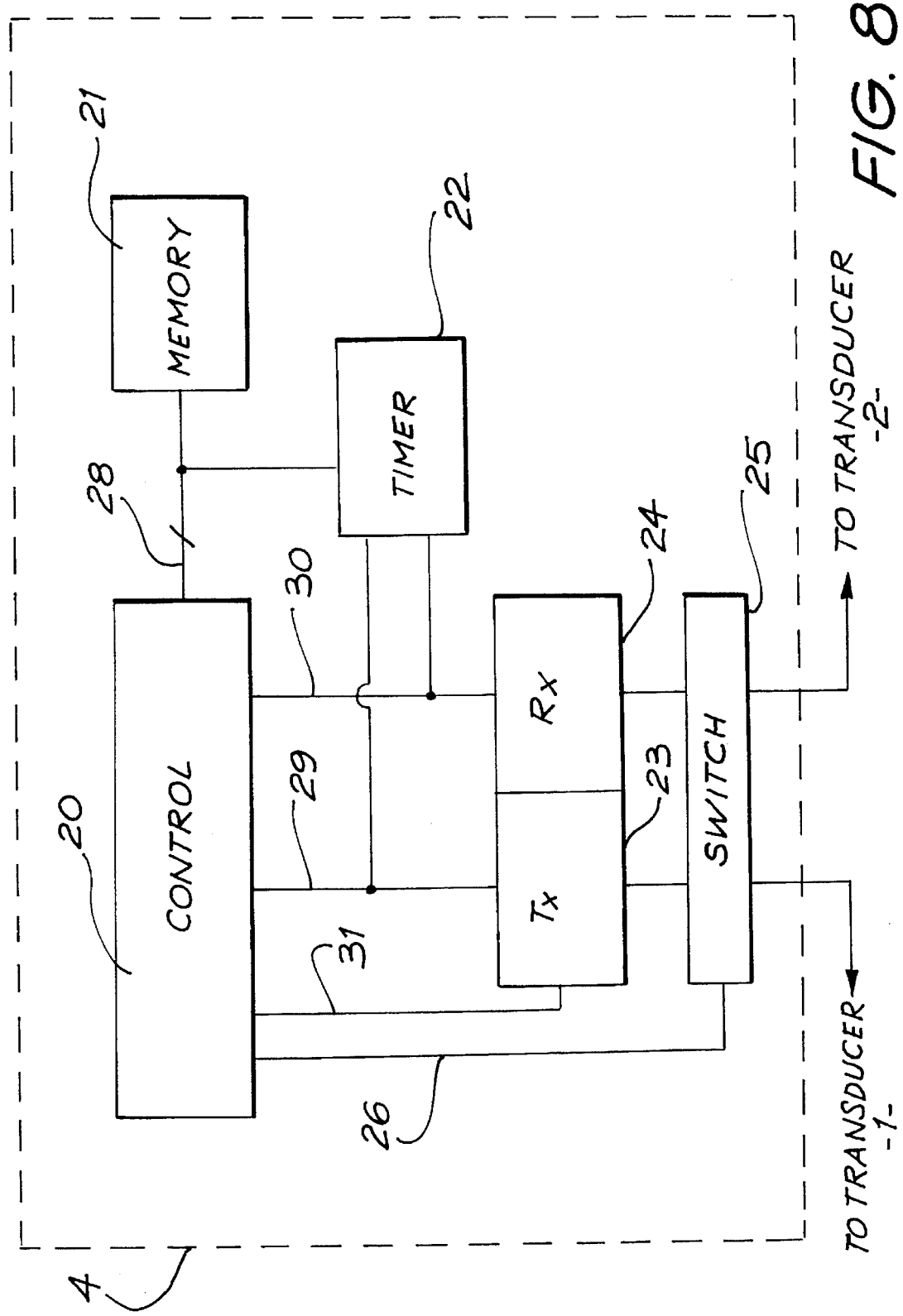
FIG. 8 shows an embodiment of the electronic module of FIG. 1.

The mode suppression techniques described above can be implemented in a variety of ways, one such way being shown in block diagram form in FIG. 8. Here, the electronics module 4 includes a control unit 20 which is generally a microprocessor based device. A transmitter 23 and receiver 24 are provided to enable transmission and reception of acoustic signals from the transducers 1 and 2, shown in FIG.1. The transmitter 23 and receiver 24 connect to the transducers 1,2 via a switching device 25 which, under control of the control device 20 via connection 26, acts to switch the direction of acoustic transmission from transducer 1 to 2, to, transducer 2 to 1.

A memory device 21 and timer 22 connect to the control device 20 via a bus 28. The timer 22 also receives a START signal, via line 29, from the control device 20 which is similarly connected to the transmitter 23 to initiate the transmission of an acoustic wave packet. On reception of the wave packet, the receiver 24 outputs a STOP signal via line 30 to the timer 22 and the control device 20.

The STOP signal acts firstly to transfer a time value, corresponding to the time of flight of the wave packet through the duct 3, to the memory 21, and secondly to inform the control device 20 that the next ringaround pulse should be transmitted.

After the transmission of a predetermined number of ringaround pulses, for example 64, the time of flight values can then be averaged mathematically by the control device 20 and a value for flow velocity calculated using the known value of the length $\chi$ of the duct 3, which is preprogrammed in memory 21. The calculated value of flow velocity can be further averaged by reversing the direction of propagation by actuating the switch 25.

A further connection 31 from the control device 20 to the transmitter 23 provides an inversion enable signal which causes the transmitter 23 to emit a wave packet that is inverted. A circuit such as that shown in FIG. 5A can be included in the transmitter for such a purpose. Most preferably the connection 31 is enabled with every fourth initiation provided by connection 29. Generally, in a ringaround sequence of four packets, it is preferred that the third packet is inverted, such as shown in FIG. 5B.

The foregoing describes only one embodiment of the present invention and modifications, obvious to those skilled in the art, can be made thereto without departing from the scope of the present invention.

For example, the disclosed method is also useful in the measurement of a ship's speed through water where the ship's hull comprises a single reflective surface which may cause high-order mode propagation.

Industrial Applicability

The present invention is applicable to the reduction of errors in fluid flow measurement and to gas velocity measurement in particular.

I claim:

1. A method for measuring time of flight of a plurality of acoustic wave packets between two locations in a fluid having at least one acoustically reflective surface in the path of said packets, said method comprising the steps of:

(a) transmitting at least one acoustic wave packet, having a first phase, between the locations and measuring time of flight thereof;

(b) transmitting an acoustic wave packet having a second phase, of inverted polarity with respect to the immediately preceding packet to substantially reduce the effects of high order acoustic modes on at least one wave packet having the first phase said at least one wave packet being selected from the group consisting of at least an immediately preceding wave packet and an immediately following wave packet, and measuring a time of flight thereof; and (c) repeating steps (a) and (b) wherein the transmission of successive wave packets is initiated immediately upon reception of a wave packet at one of said locations.

2. A method as claimed in claim 1 wherein said path has extremities defined by a duct for carrying said fluid.

3. A method as claimed in claim 2, wherein said duct is a conduit and said locations are disposed in a direction of flow of said fluid.

4. A method as claimed in claim 1 wherein steps (a) and (b) are repeated a plurality of times and an average time of flight is calculated.

5. A method as claimed in claim 4 wherein steps (a) and (b) are repeated between one and $10^6$ times.

6. A method as claimed in claim 5 wherein steps (a) and (b) are repeated between 31 and 65 times.

7. A method as claimed in claim 1 wherein step (a) comprises the transmission of three acoustic wave packets, and step (b) comprises the transmission of a single acoustic wave packet.

8. A method as claimed in claim 1 wherein at each said location there is arranged a transducer for the transmission and reception of said wave packets, in which the transmission of successive wave packets is initiated immediately upon reception of a wave packet by one of said transducers.

9. A method for determining fluid flow velocity in a duct in which first and second acoustic transducers are spaced by a predetermined distance within said duct, the method comprising the steps of:

(1) transmitting an acoustic wave packet having a first phase, from said first transducer to said second transducer;

(2) detecting said acoustic wave packet at said second transducer and recording a time of travel of said acoustic wave packet between said transducers;

(3) performing steps (1) and (2) i times (i=1, 2, 3, . . .) whereby successive transmissions are initiated upon the detection of the immediately preceding acoustic wave packet;

(4) performing steps (1) and (2) by transmitting an acoustic wave packet having a second phase of inverted polarity with respect to said first phase;

(5) performing steps (1) to (4) j times (j=1,2,3, . . .);

(6) performing steps (1) to (5) except however by transmitting from said second transducer and detecting at said first transducer; and (7) summing the times of travel in each direction, and, for the number (n) of transmissions in each direction (n=j(i+1)), determining an average time of travel in each direction to enable the calculation therefrom of the fluid flow velocity using said predetermined distance.

10. A method as claimed in claim 9 wherein i is three (3).

11. A method as claimed in claim 9 wherein j is sixteen (16).

12. A method as claimed in claim 2 or 9 wherein said fluid is gas and said duct forms part of a gas reticulation system.

13. Apparatus for determining the flow velocity of a fluid, said apparatus comprising:

two acoustic transducers separated by a predetermined distance within said fluid and arranged to transmit and receive acoustic energy between each other, there being at least one acoustically reflective surface between said transducers;

controls means outputting a first signal to initiate transmission of an acoustic wave packet between said transducers;

transmitter means enabled by said first signal and connected to one of said transducers for energising said one transducer to emit an acoustic wave packet;

receiver means connected to the other said transducer for receiving said acoustic wave packet and to provide a second signal corresponding to the reception of said wave packet;

timer means connected to said first signal for starting a clock that times the propagation of said wave packet along said duct between said transducers and connected to said second signal for stopping said clock;

wherein said second signal further inputs to said control means to immediately cause the emission of a further said first signal so as to cause a sequential emission of a series of said wave packets, said control means also outputting to said transmitter means an inversion signal concurrent with one of a predetermined number of said first signals, said inversion signal causing said transmitter means and said one transducer to output an acoustic wave packet inverted with respect to the immediately preceding wave packet, the times recorded by said timer means being stored and subsequently averaged for the calculation of a fluid flow velocity using said predetermined distance by said control means.

14. Apparatus as claimed in claim 13 wherein an inverted wave packet is transmitted after the transmission of three wave packets having the same phase.

15. Apparatus as claimed in claim 14 in which a plurality of said wave packets are transmitted from one said transducer to the other said transducer, followed by transmission of a corresponding plurality of said wave packets from said other transducer to said one transducer.

16. Apparatus as claimed in claim 15 wherein said control means determines flow velocity with an accuracy better than ±0.02 meters per second for flow rates between 0 and 6 cubic meters per hour.

17. Apparatus as claimed in claim 16 wherein said control means determines flow velocity with an accuracy of at least ±0.01 meters per second for flow rates between 1.5 and 6 cubic meters per hour.

18. A method for measuring time of flight of a plurality of acoustic wave packets between two locations in a fluid having at least one acoustically reflective surface in the path of said packets, said method comprising the steps of:

(a) transmitting at least one acoustic wave packet, having a first phase, between the locations and measuring time of flight thereof;

(b) transmitting an acoustic wave packet having a second phase of inverted polarity with respect to the immediately preceding packet and thereby substantially reducing the effects of at least two high order integral fraction acoustic modes on at least one wave packet having the first phase said at least one wave packet being selected from the group consisting of at least an immediately preceding wave packet and an immediately following wave packet, and measuring a time of flight thereof; and (c) repeating steps (a) and (b) wherein the transmission of successive wave packets is initiated immediately upon reception of a wave packet at one of said locations.

19. A method as claimed in claim 18, wherein step (a) comprises the transmission of three acoustic wave packets, and step (b) comprises the transmission of a single acoustic wave packet, and said high order integral fraction acoustic modes travel at speeds inversely integrally proportional to a primary acoustic mode of each said wave packet, and the effects of said high order integral fraction acoustic modes are reduced excepting those that travel at a speed $1/(4n+1)$ (n=1,2,3 . . .) times that of the corresponding primary acoustic mode.

20. Apparatus for determining the flow velocity of a fluid, said apparatus comprising:

two acoustic transducers separated by a predetermined distance within said fluid and arranged to transmit and receive acoustic energy between each other, there being at least one acoustically reflective surface between said transducers;

control means outputting a first signal to initiate transmission of an acoustic wave packet between said transducers;

transmitter means enabled by said first signal and connected to one of said transducers for energizing said one transducer to emit an acoustic wave packet;

receiver means connected to the other said transducer for receiving said acoustic wave packet and to provide a second signal corresponding to the reception of said wave packet;

timer means connected to said first signal for starting a clock for timing the propagation of said wave packet between said transducers and connected to said second signal for stopping said clock;

wherein said second signal further inputs to said control means to immediately cause the emission of a further said first signal so as to cause a sequential emission of a series of said wave packets, said control means also outputting to said transmitter means an inversion signal concurrent with one of a predetermined number of said first signals, said inversion signal causing said transmitter means and said one transducer to output an acoustic wave packet inverted with respect to the immediately preceding wave packet, the inverted acoustic wave packet reducing the effects of at least two high order integral fraction acoustic modes on said wave packets, the times recorded by said timer means being stored and subsequently averaged for the calculation of a fluid flow velocity using said predetermined distance by said control means.

21. Apparatus as claimed in claim 20, wherein an inverted wave packet is transmitted after the transmission of three wave packets having the same phase and said high order integral fraction acoustic modes travel at speeds inversely integrally proportional to a primary acoustic mode of each said wave packet, and the effects of said high order integral fraction acoustic modes are reduced excepting those that travel at a speed $1/(4n+1)$ (n=1,2,3 . . .) times that of the corresponding primary acoustic mode.

22. Apparatus as claimed in claim 20, wherein said apparatus comprises a unipolar power supply and said inverted wave packet commences with transition opposite to that of the immediately preceding wave packet.

23. Apparatus as claimed in claim 22, wherein said transmitter means comprises a gain switchable amplifier, said inversion signal acting to alter the gain of said amplifier from positive to negative.

24. A method for determining fluid flow velocity in a duct in which first and second acoustic transducers are spaced by a predetermined distance within said duct, the method comprising the steps of:

(1) transmitting an acoustic wave packet, having a first phase, from said first transducer to said second transducer;

(2) detecting said acoustic wave packet at said second transducer and recording a time of travel of said acoustic wave packet between said transducers;

(3) performing steps (1) and (2) i times (i=1, 2, 3, . . .) whereby successive transmissions are initiated upon the detection of the immediately preceding acoustic wave packet;

(4) performing steps (1) and (2) by transmitting an acoustic wave packet having a second phase comprising a polarity inverted with respect to said first phase, said second phase acoustic wave packet reducing the effects of at least two high order integral fraction acoustic modes upon at least one subsequent detection of said wave packets;

(5) performing steps (1) to (4) j times (j=1, 2, 3, . . .)

(6) performing steps (1) to (5) except however by transmitting from said second transducer and detecting at said first transducer; and (7) summing the times of travel in each direction, and, for the number (n) of transmissions in each direction (n=j(i+1)), determining an average time of travel in each direction to enable the calculation therefrom of the fluid flow velocity using said predetermined distance.

25. A method as claimed in claim 24 wherein said high order integral fraction acoustic modes travel at speeds inversely integrally proportional to a primary acoustic mode of each said wave packet, and the effects of said high order integral fraction acoustic modes are reduced excepting those that travel at a speed $1/(4n+1)$ ($n=1,2,3$ . . .) times that of the corresponding primary acoustic mode.

26. A method for measuring time of flight of a plurality of acoustic wave packets between two locations in a fluid in a duct having at least one acoustically reflective surface in the path of said packets, said method comprising the steps of:

(a) providing first and second ultrasonic transducers in the duct, at the two locations;

(b) transmitting from one transducer to the other at least one acoustic wave packet, having a first phase and measuring time of flight thereof between the transducers wherein at least a portion of a transmitted acoustic wave propagates to the receiving transducer without reflections from the duct;

(c) transmitting from one transducer to the other an acoustic wave packet having a second phase of inverted polarity with respect to the immediately preceding packet and thereby substantially reducing the effects of selected acoustic modes on at least one wave packet having the first phase said at least one wave packet being selected from the group consisting of at least an immediately preceding wave packet and an immediately following wave packet, and measuring a time of flight thereof; and (d) repeating steps (b) and (c) wherein transmission of successive wave packets is initiated immediately upon reception of a wave packet at one of said locations.

27. Apparatus for determining the flow velocity of a fluid in a duct, said apparatus comprising:

two acoustic transducers, located within the duct and the fluid, separated by a predetermined distance and arranged to transmit and receive acoustic energy between each other, there being at least one acoustically reflective surface between said transducers wherein at least some of said acoustic energy is transmitted between said transducers without reflection off of the duct;

control means outputting a first signal to initiate transmission of an acoustic wave packet between said transducers;

transmitter means enabled by said first signal and connected to one of said transducers for energizing said one transducer to emit an acoustic wave packet;

receiver means connected to the other said transducer for receiving said acoustic wave packet and to provide a second signal corresponding to the reception of said wave packet;

timer means connected to said first signal for starting a dock for timing the propagation of said wave packet between said transducers and connected to said second signal for stopping said dock;

wherein said second signal further inputs to said control means to immediately cause the emission of a further said first signal so as to cause a sequential emission of a series of said wave packets, said control means also outputting to said transmitter means an inversion signal concurrent with one of a predetermined number of said first signals, said inversion signal causing said transmitter means and said one transducer to output an acoustic wave packet inverted with respect to the immediately preceding wave packet, the inverted acoustic wave packet reducing the effects of selected high order acoustic modes on said wave packets, the times recorded by said timer means being stored and subsequently averaged for the calculation of a fluid flow velocity by said control means.

28. Apparatus as claimed in claim 27, wherein an inverted wave packet is transmitted after the transmission of three wave packets having the same phase and said high order acoustic modes travel at speeds inversely integrally proportional to a primary acoustic mode of each said wave packet, and the effects of said high order acoustic modes are reduced excepting those that travel at a speed $1/(4n+1)$ ($n=1,2,3$, . . .) times that of the corresponding primary acoustic mode.

\* \* \* \* \*